(12) United States Patent
Naito (10) Patent No.: US 11,148,093 B2
(45) Date of Patent: Oct. 19, 2021

(54) GAS CONCENTRATOR

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 210 days.

(21) Appl. No.: 16/429,821

(22) Filed: Jun. 3, 2019

(65) Prior Publication Data

US 2019/0282950 A1 Sep. 19, 2019

Related U.S. Application Data

(63) Continuation of application No. PCT/JP2017/033484, filed on Sep. 15, 2017.

(30) Foreign Application Priority Data

Dec. 5, 2016 (JP) .............................. JP2016-235501

(51) Int. Cl.
| | |
|---|---|
| *B01D 53/047* | (2006.01) |
| *B01D 53/04* | (2006.01) |
| *B01D 53/62* | (2006.01) |
| *B01D 53/82* | (2006.01) |

(52) U.S. Cl.
CPC ....... *B01D 53/047* (2013.01); *B01D 53/0407* (2013.01); *B01D 53/62* (2013.01); *B01D 53/82* (2013.01); *B01D 2253/108* (2013.01); *B01D 2253/116* (2013.01); *B01D 2253/204* (2013.01); *B01D 2257/504* (2013.01)

(58) Field of Classification Search
CPC .. B01D 53/04; B01D 53/047; B01D 53/0407; B01D 53/62; B01D 53/82; B01D 2253/108; B01D 2253/116; B01D 2253/204; B01D 2257/504; B01D 2259/0283
USPC .................................. 96/121, 126, 138, 151
See application file for complete search history.

(56) References Cited

U.S. PATENT DOCUMENTS

| | | | | |
|---|---|---|---|---|
| 2,586,670 | A | * | 2/1952 | Lambertsen ....... B01D 53/0446 96/149 |
| 3,948,775 | A | * | 4/1976 | Otani ..................... B01D 15/00 210/264 |

(Continued)

FOREIGN PATENT DOCUMENTS

| | | |
|---|---|---|
| JP | 50-11864 | 5/1975 |
| JP | 52-138060 | 11/1977 |

(Continued)

OTHER PUBLICATIONS

International Search Report dated Nov. 7, 2017 in PCT/JP2017/033484 filed Sep. 15, 2017.

*Primary Examiner* — Frank M Lawrence, Jr.
(74) *Attorney, Agent, or Firm* — Oblon, McClelland, Maier & Neustadt, L.L.P.

(57) ABSTRACT

Provided are an adsorption tank into and through which a gas mixture of plural kinds of gases is introduced and is passed along a horizontal direction, and an adsorbent layer housed in the adsorption tank to adsorb a gas in the gas mixture as adsorption component when the gas mixture is introduced under an adsorption pressure to the adsorption tank and desorb the adsorbed adsorption component when the adsorption tank is reduced in pressure to a desorption pressure lower than the adsorption pressure.

4 Claims, 4 Drawing Sheets

(56) References Cited

U.S. PATENT DOCUMENTS

| | | | | |
|---|---|---|---|---|
| 4,026,680 A | * | 5/1977 | Collins | B01D 53/0423 |
| | | | | 95/99 |
| 4,444,727 A | * | 4/1984 | Yanagihara | B01D 53/04 |
| | | | | 422/223 |
| 4,826,510 A | * | 5/1989 | McCombs | B01D 53/0407 |
| | | | | 128/204.18 |
| 5,672,196 A | * | 9/1997 | Acharya | B01D 53/0407 |
| | | | | 95/104 |
| 2005/0051029 A1 | * | 3/2005 | Lloyd | B01D 53/0446 |
| | | | | 96/109 |
| 2014/0245890 A1 | * | 9/2014 | Walker | B01D 53/0407 |
| | | | | 96/133 |
| 2015/0007723 A1 | * | 1/2015 | Berges | B01D 53/047 |
| | | | | 95/96 |

FOREIGN PATENT DOCUMENTS

| | | |
|---|---|---|
| JP | 55-92122 | 7/1980 |
| JP | 62-210031 | 9/1987 |
| JP | 1-297118 | 11/1989 |
| JP | 4-29712 | 1/1992 |
| JP | 6-91226 | 4/1994 |
| JP | 8-52317 | 2/1996 |
| JP | 2014-188508 | 10/2014 |
| WO | WO 00/59610 A1 | 10/2000 |

* cited by examiner

GAS CONCENTRATOR

TECHNICAL FIELD

The present disclosure relates to a pressure swing adsorption type gas concentrator in which a specific gas is extracted as an adsorption component from a gas mixture of plural kinds of gases, using differences in adsorbability of the gases to an adsorbent.

BACKGROUND ART

Conventionally, a pressure swing adsorption process (PSA process) has been widely used to separate and concentrate a specific kind of gas from a gas mixture of plural kinds of gases (see, for example, Patent Literature 1 mentioned below).

A gas concentrator using such pressure swing adsorption process comprises a plurality of adsorption tanks with zeolite or other adsorbent. Passed under pressure through the adsorption tanks is a gas mixture such as exhaust gases from a boiler. Then, among the gases constituting the gas mixture, a specific gas liable to be adsorbed into the adsorbent is adsorbed as an adsorption component to the adsorbent. The gases not adsorbed are discharged as non-adsorption components from the adsorption tanks.

At a time when the adsorption component is adsorbed to the adsorbent to some extent, a pressure of the adsorption tank is lowered so that the adsorption component is desorbed from the adsorbent. Through such series of steps, the specific gas can be separated and concentrated as the adsorption component from the gas mixture. The steps of adsorbing the adsorption component to the adsorbent and desorbing the adsorbed adsorption component from the adsorbent can be switchedly conducted through the plural adsorption tanks to continuously conduct the gas separation and concentration.

CITATION LIST

Patent Literature

Patent Literature 1: JPH0691226A

SUMMARY

Technical Problems

In recent years, development of oxyfuel combustion boilers has been advanced from a viewpoint of decreasing a carbon dioxide emission amount. In the oxyfuel combustion boilers, most of exhaust gases are constituted by water and carbon dioxide so that carbon dioxide can be easily withdrawn, using the gas concentrator as mentioned in the above.

In an oxyfuel combustion boiler which generates a large amount of exhaust gases, for example, of the order of a few hundred thousand $m^3$ N/h, continuous treatment of the exhaust gases due to combustion requires a gas concentrator having compatible process capability.

In the gas concentrator as mentioned in the above, a simplest way of increasing a process amount of the exhaust gases per unit time is to increase volumes of the adsorption tanks and increase an amount of the adsorbent contained. However, to increase the volumes of the adsorption tanks inevitably results in proportional increase in weight of the whole apparatus, disadvantageously leading to increase in construction cost of the gas concentrator.

Moreover, in the adsorption step, heat is generated due to the adsorption of the gas. It is therefore feared that the more the adsorption tanks are increased in volume, the more the temperature rise tends to be caused by the adsorption heat and the more the generated heat tends to be stored inside.

In view of the above, the present disclosure has its object to provide a gas concentrator capable of reducing construction cost and preventing adsorption tanks from becoming high-temperatures in an adsorption step while ensuring enough volumes of the adsorption tanks.

Solution to Problems

The present disclosure is directed to a pressure swing adsorption type gas concentrator comprising an adsorption tank into and through which a gas mixture of plural kinds of gases is introduced and is passed along a horizontal direction, and an adsorbent layer housed in the adsorption tank to adsorb a gas in the gas mixture as adsorption component when the gas mixture is introduced under an adsorption pressure to the adsorption tank and desorb the adsorbed adsorption component when the adsorption tank is reduced in pressure to a desorption pressure lower than the adsorption pressure.

In the gas concentrator of the disclosure, it is preferable that a plurality of adsorption tanks are arranged proximity to one another, adsorbent layers in the plural adsorption tanks being connected together through heat-conductive heat-transfer bodies.

In the gas concentrator of the disclosure, it is preferable that the adsorption tanks are arranged in a vertically stacked manner, the adsorbent layers in the vertically arranged adsorption tanks being close together through a partition plate.

In the gas concentrator of the disclosure, it is preferable that each of the adsorbent layers is divided into a plurality of adsorbent units each with adsorbent, the partition plate being divided into a plurality of petty partition plates, an upper one of the mutually vertically arranged adsorption tanks having top faces which enable access from outside of the adsorption tank into an inner space.

In the gas concentrator of the disclosure, it is preferable that divided positions of the adsorbent layer into the adsorbent units in the vertically arranged adsorption tanks are matched in planar view with those of the partition plate into the petty partition plates.

Effects

A gas concentrator of the disclosure exhibits excellent effects that construction cost can be reduced and the adsorption tank can be prevented from becoming high-temperatures in an adsorption step while ensuring enough volume of the adsorption tank.

DESCRIPTION OF EMBODIMENT

An embodiment of the invention will be described in conjunction with attached drawings.

Figure 1:
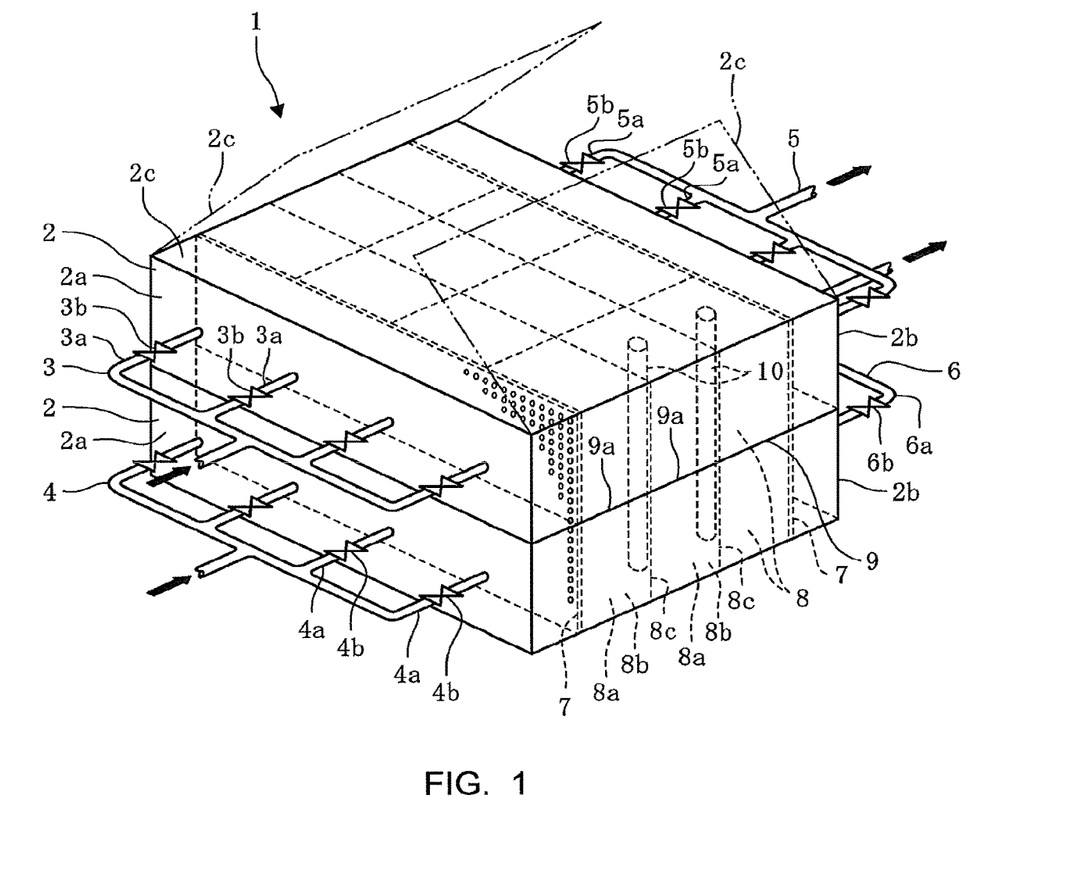
FIG. 1 is a perspective view showing a gas concentrator according to an embodiment of the invention.
Figure 2:
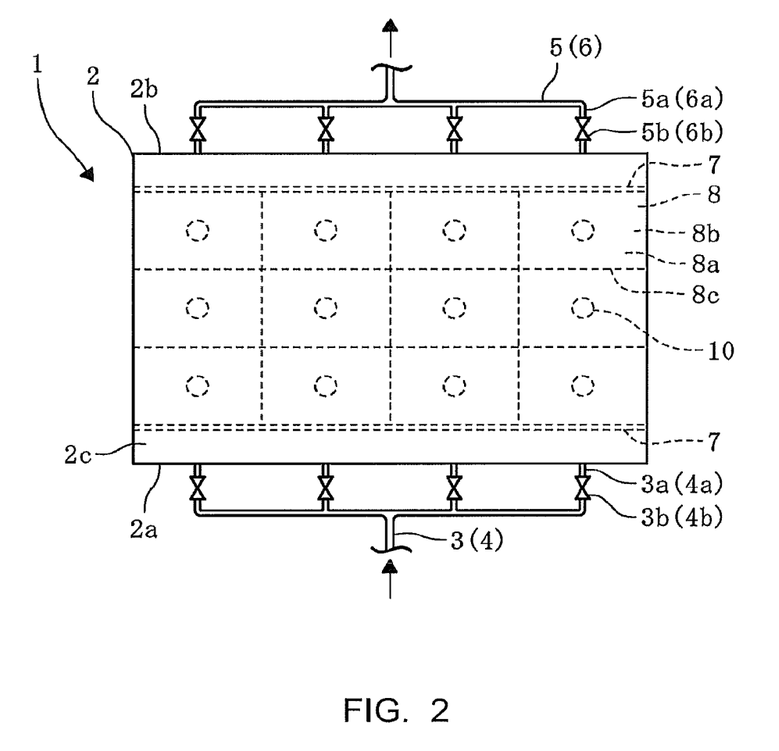
FIG. 2 is a plan view showing the gas concentrator according to the embodiment of the invention.
Figure 3:
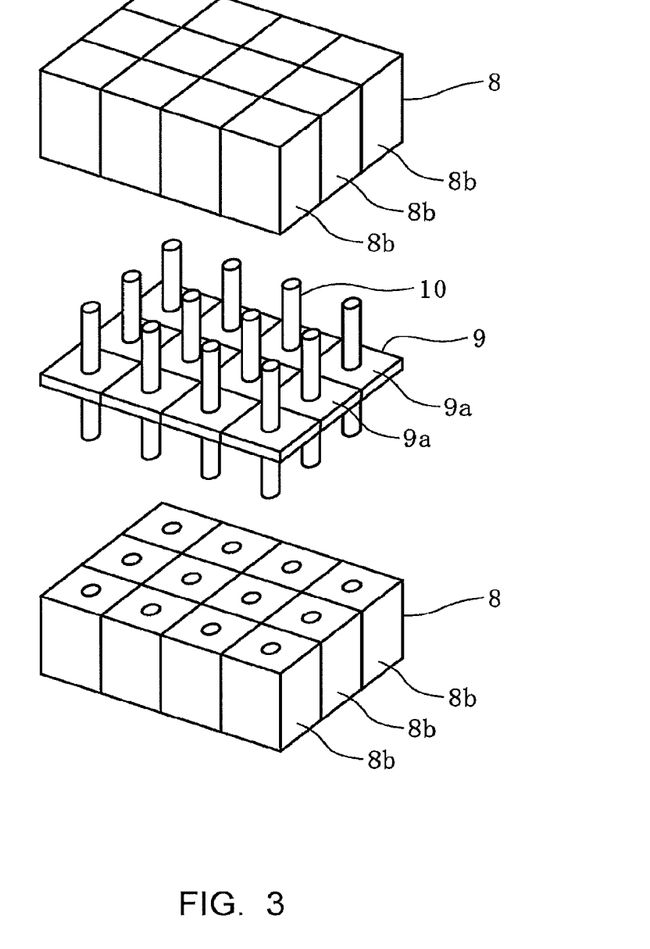
FIG. 3 is a perspective view showing, in an exploded manner, a portion of the gas concentrator according to the embodiment of the invention.
Figure 4:
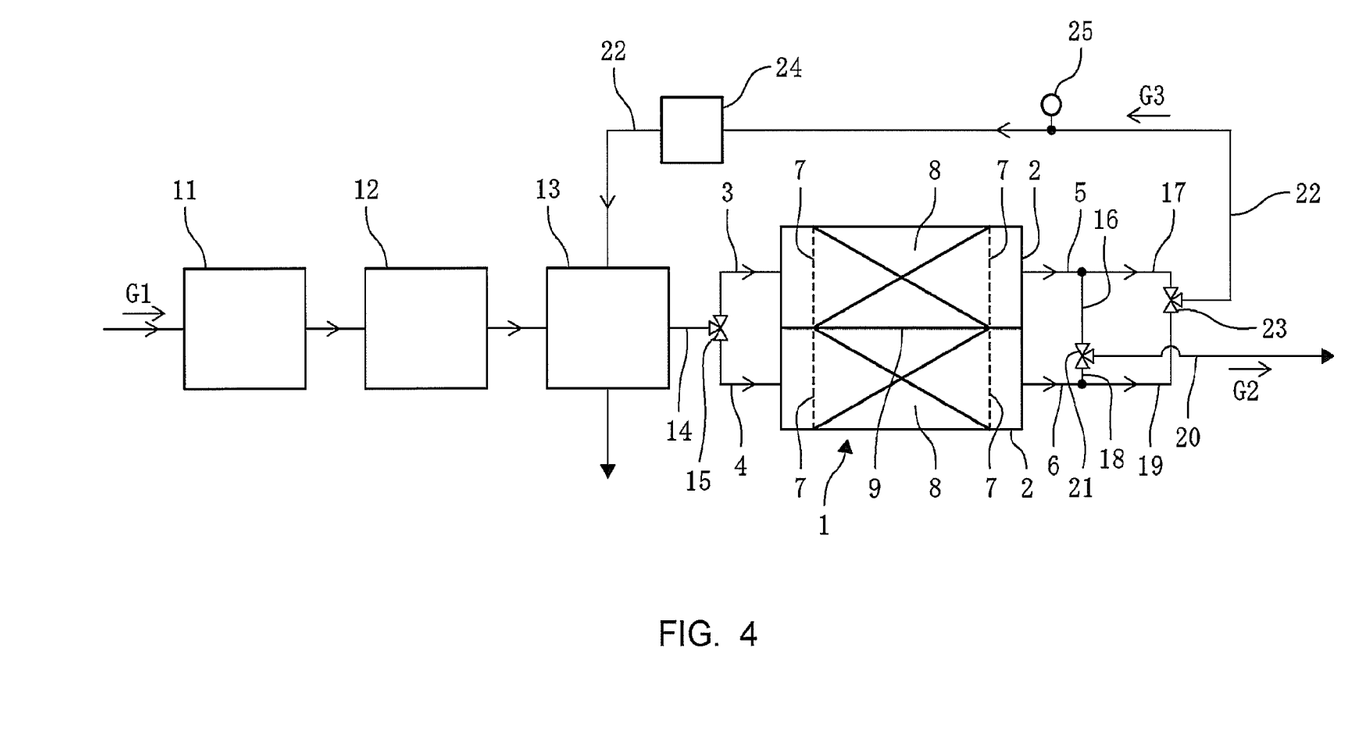
FIG. 4 is a block diagram showing an example of a gas concentration system employing the gas concentrator according to the embodiment of the invention.

FIGS. 1-3 exemplarily show an embodiment of the invention. FIG. 4 shows an example of a gas concentration system by way of a pressure swing adsorption process, employing the gas concentrator according to the embodiment of the invention.

As shown in FIG. 1, the greatest characteristic in a gas concentrator 1 according to the embodiment is that vertically stacked are a plurality of adsorption tanks 2 each in the form of a rectangular parallelepiped. Exemplified here is a case where the adsorption tanks 2 are stacked in two stages. Each of the adsorption tanks 2 has one and the other side surfaces 2a and 2b to which connected are an inlet pipe 3 or 4 and an outlet pipe 5 or 6 as introduction and discharge flow passages to introduce and discharge gases along a horizontal direction into and from the tank 2, respectively; in the adsorption tank 2, the introduced gases are passed along the horizontal direction. Here, the wording "along the horizontal direction" means "substantially in the horizontal direction" and includes not only "strictly in the horizontal direction" but also "slightly aslope from the horizontal direction".

The inlet pipe 3 or 4 extends from outside of and toward the adsorption tank 2 and is branched short of and connected to the one side surface 2a. Thus, the gases are introduced through a plurality of branch pipes 3a or 4a into the upper or lower adsorption tank 2. The gases are discharged from the adsorption tank 2 through branch pipes 5a or 6a projecting from the other side surface 2b and are joined together downstream into the outlet pipe 5 or 6 extending further downstream of the adsorption tank 2. Each of the branch pipes 3a or 4a for the inlet pipe 3 or 4 and the branch pipes 5a or 6a for the outlet pipe 5 or 6 is provided with a valve 3b, 4b, 5b or 6b capable of adjusting a flow rate of the gases passing inside. Disclosed here is a case where the inlet pipes 3 and 4 and the outlet pipes 5 and 6 are branched into four branch pipes 3a, 4a, 5a and 6a, respectively; number and arrangement branched may be changed appropriately.

Dispersion plates 7 are arranged in each of the adsorption tanks 2 in positions facing to the one and the other side surfaces 2a and 2b, respectively. The adsorbent 8a is housed between the two dispersion plates 7 to provide an adsorbent layer 8. Each of the dispersion plates 7 is a plurally perforated punched metal arranged in a spaced-apart relationship with the one or other side surface 2a or 2b. The gases introduced from the one side surface 2a through the branch pipes 3a or 4a of the inlet pipe 3 or 4 are passed through a space between the one side surface 2a and the inlet-side dispersion plate 7 and through the inlet-side dispersion plate 7 to a space where the adsorbent layer 8 is arranged. The gases are further passed through the outlet-side dispersion plate 7 to a space between the outlet-side dispersion plate 7 and the other side surface 2b and are discharged through the branch pipes 5a or 6a of the outlet pipe 5 or 6.

Various materials such as synthesized zeolite or molecular sieve may be used as the adsorbent 8a. Employed in the embodiment is the adsorbent 8a constituted by metal organic framework (MOF) especially suitable for adsorption of carbon dioxide. The adsorbent 8a adsorbs carbon dioxide in the gases under an adsorption pressure higher than an atmospheric pressure, and desorbs the adsorbed carbon dioxide under a desorption pressure near the atmospheric pressure lower than the adsorption pressure. Hereinafter, the wording "adsorption pressure" refers to a pressure at which the adsorbent 8a can adsorb a specific adsorption component. The wording "desorption pressure" refers to a pressure lower than the adsorption pressure which enables desorption of the adsorption component adsorbed by the adsorbent 8a.

In the embodiment, the adsorbent layer 8 is an assembly of a plurality of adsorbent units 8b. Each of the adsorbent units 8b comprises a rectangular-parallelepiped-shaped basket body 8c made of gas-permeable mesh or other material and filled with the adsorbent 8a. In each of the adsorption tanks 2, as shown in FIGS. 1-3, the plural adsorbent units 8b are horizontally laid out to provide the adsorbent layer 8.

In other words, the adsorbent layer 8 is partitioned and divided by the basket bodies 8c into the plural adsorbent units 8b. Divided positions of the adsorbent layers 8 in the upper adsorption tank 2 are matched in planar view with those in the lower adsorption tank 2 as shown in FIGS. 2 and 3.

The upper and lower adsorption tanks 2 are partitioned by a partition plate 9 which provides a plane along the horizontal direction. The adsorbent layers 8 in the upper and lower adsorption tanks 2 are close together through the partition plate 9. As shown in FIGS. 1-3, vertically penetrating through the partition plate 9 are heat-transfer bodies 10 extending along the vertical direction. In FIG. 1, only some of the heat-transfer bodies 10 are shown for convenience for showing them in the figure.

Each of the heat-transfer bodies 10 is, for example, a hollow metallic bar having therein water, organic solvent or other heat medium. Each of the heat-transfer bodies 10 is arranged such that upper and lower portions thereof are buried in the adsorbent layers 8 of the upper and lower adsorption tanks 2, respectively. Thus, the heat-transfer bodies 10 interconnect the upper and lower adsorbent layers 8 so that heat generated in the adsorbent layer 8 in one of the adsorption tanks 2 is quickly transmitted to the adsorbent layer 8 in the other adsorption tank 2. The heat-transfer body 10 is not restricted to the above-mentioned setup, and may be various in shape or construction; for example, it may be constituted by solid metal with no heat medium therein or may be, for example, plate-shaped other than rod-shaped.

The partition plate 9 is made of highly heat-conductive metal or other material and is divided into a plurality of petty partition plates 9a. As shown in FIG. 3, the divided positions of the partition plate 9 into the petty partition plates 9a are matched in planar view with those of the adsorbent layers 8 positioned on and below the partition plate 9. That is, arranged singly on and below each of the petty partition plates 9a are the adsorbent units 8b. The partition plate 9 has the heat-transfer bodies 10 each for each of the petty partition plates 9a. Gaps between the petty partition plates 9a are sealed by sealing members (not shown) so as to retain gas-tightness.

A number of the heat-transfer bodies 10 may be increased or decreased depending on conditions such as thermal-conductivity of the heat-transfer bodies 10 and heat amount supposed to be generated in an adsorption step mentioned below. Though explained here is the arrangement of the heat-transfer bodies 10 each arranged centrally of the corresponding adsorbent unit 8b in planar view, such arrangement may be changed suitably; e.g., each of the heat-transfer bodies 10 may be positioned between the adsorbent units 8b.

Though explained here is the example where each of the adsorbent layers 8 and the partition plates 9 are divided into twelve adsorbent units 8b and twelve petty partition plates 9a, respectively, division number and shape of the adsorbent unit 8b and the petty partition plate 9a may be changed suitably.

As shown in FIG. 1, among the vertically two-staged adsorption tanks 2, the upper adsorption tank 2 has top faces vertically openable as lid bodies 2c. When necessary, the lid bodies 2c may be opened for accessibility to the adsorbent layer 8, the dispersion plates 7, the partition plate 9 and the like housed in an inner space. The lid bodies 2c are not restricted to vertically openable ones as shown but may be opened, for example, by a horizontally sliding motion. The openable structure for the adsorption tank 2 may be any, provided that permitted is access into the adsorption tank 2 as needs demand while the adsorption tank 2 is kept gas-tightness when closed.

FIG. 4 shows an example of a gas concentration system, using the gas concentrator 1 as mentioned in the above. The gas mixture G1 as exhaust gases discharged from a combustion boiler (not shown) and including plural kinds of gases is cooled by a cooler 11 before treated in the gas concentrator 1. The gas mixture G1 as the exhaust gases is generally high-temperatures of the order of a few hundred degrees C. whereas a temperature suitable for adsorption of a specific gas to the adsorbent 8a (see FIGS. 1-3) is of the order of from normal temperature to tens of degrees C. For this reason, the gas mixture G1 is lowered in temperature beforehand; due to the cooling, the gas mixture G1 is also reduced in volume, which is advantageous in enhancing the treatment efficiency in the gas concentrator 1 and other installations. After cooled, the gas mixture G1 is pressurized by a compressor 12 and then is delivered for dehydration to a dehydrating column 13 filled with silica gel or other dehydrating agent. Water is adsorbed and removed by passing the gas mixture G1 through the dehydrating agent.

When the gas mixture G1 is the exhaust gases from a coal-fired boiler, etc., properly arranged upstream or downstream of the cooler 11, the compressor 12 and the dehydrating column 13 are various kinds of installations (not shown) such as a gas-liquid separator, a desulfurizer, a denitrator and a mercury removing device for prevention of apparatuses including the gas concentrator 1 from being corroded and deteriorated in performances and for enhancement in fineness of eventually separated carbon dioxide.

The dehydrated gas mixture G1 is then delivered to the adsorption tank 2 in the gas concentrator 1. In that occasion, a flow passage 14 for the gas mixture G1 is branched into the inlet pipes 3 and 4 for the upper and lower adsorption tanks 2, respectively. Provided at a branch point into the upper and lower inlet pipes 3 and 4 is a three-way valve 15 as a flow passage switch. Introduction of the gas mixture G1 is switched by the three-way valve 15 between the inlet pipes 3 and 4 into the upper and lower adsorption tanks 2.

The outlet pipes 5 and 6 for the upper and lower adsorption tanks 2 are branched downstream of the adsorption tanks 2 into the flow passages 16 and 17 and the flow passages 18 and 19, respectively. The flow passage 16 branched from the outlet pipe 5 is joined with the flow passage 18 branched from the outlet pipe 6 into the flow passage 20. Arranged at the joining point from the flow passages 16 and 18 to the flow passage 20 is a three-way valve 21 as a flow passage switch. Further, the flow passage 17 branched from the outlet pipe 5 is joined with the flow passage 19 branched from the outlet pipe 6 into the flow passage 22. Arranged at a joining point from the flow passages 17 and 19 to the flow passage 22 is a three-way valve 23 as a flow passage switch.

Discharged through the flow passage 20 is carbon dioxide as an adsorption component G2 selectively extracted from the gas mixture G1 as mentioned hereinafter and delivered to, for example, a compression or storage equipment (not shown).

On the other hand, discharged through the flow passage 22 are non-adsorption components G3 of the gas mixture G1 from which the adsorption component G2 has been extracted as mentioned hereinafter. The non-adsorption components G3 are heated by a heater 24 and then delivered to a dehydrating column 13 where the non-adsorption components G3 are utilized for regeneration of the hydrating agent in the dehydrating column 13 and are discharged together with steam to the atmosphere. Specifically, the dehydrating agent filled in the dehydrating column 13 is silica gel or the like and can be revived to have a function as dehydrating agent through discharge of adsorbed water by heating. The heater 24 may be, for example, a device for electrically heating the non-adsorption components G3. Alternatively, the heater 24 may be a heat exchanger arranged for any portion requiring cooling of the gas mixture G1 in the treatment passageway thereof to cool the same while heating the non-adsorption components G3.

Arranged further in the flow passage 22 is a concentration sensor 25 which detects a concentration of a component corresponding to the adsorption component G2 in the non-adsorption components G3 discharged through the flow passage 22. In the adsorption tank 2, a specific component as mentioned in the above (here, carbon dioxide) is adsorbed as adsorption component G2. On that occasion, all of the adsorption component G2 in the gas mixture G1 is not always removed and is partly discharged as a part of the non-adsorption components G3 without being adsorbed. Moreover, an adsorbed amount of adsorption component G2 in the adsorbent layer 8 has a limit so that, as the adsorption amount is increased to some extent, an admixed rate of carbon dioxide, which is to be adsorbed as the adsorption component G2, into the non-adsorption components G3 is increased. In the concentration sensor 25, a concentration of such component corresponding the adsorption component G2 is detected and monitored.

Next, mode of operation of the above-mentioned embodiment will be described.

The gas mixture G1 as the exhaust gases is cooled by the cooler 11, pressurized by the compressor 12 and dehydrated by the dehydrating column 13 and then is delivered to the gas concentrator 1 (see FIG. 4). On that occasion, the gas mixture G1 pressurized is introduced to one of the vertically arranged adsorption tanks 2. Specifically, opened and closed by the operation of the three-way valve 15 are the inlet pipe 3 as an introduction flow passage to the upper adsorption tank 2 and the input pipe 4 leading to the lower adsorption tank 2, respectively. The gas mixture G1 is caused to flow through the flow passage 14 and the inlet pipe 3 into the upper adsorption tank 2.

The pressure of the pressurized gas mixture G1 is set to an adsorption pressure at which the adsorbent 8a filled in the adsorption tank 2 (see FIG. 1) is capable of adsorbing carbon dioxide as the adsorption component G2. Thus, in the upper adsorption tank 2, inflow of the gas mixture G1 causes a step of adsorbing carbon dioxide in the gas mixture G1 as the adsorption component G2 to the adsorbent layer 8. Then, discharged through the outlet pipe 5 connected to the upper adsorption tank 2 are the non-adsorption components G3 remaining in the gas mixture G1 from which carbon dioxide has been adsorbed.

On that occasion, among the three-way valves 21 and 23 arranged downstream of the adsorption tank 2, the three-way valve 21 closes between the flow passage 16 from the upper adsorption tank 2 and the downstream flow passage 20. On the other hand, the three-way valve 23 opens between the flow passage 17 from the upper adsorption tank 2 and the downstream flow passage 22 and closes between the flow passage 19 from the lower adsorption tank 2 and the downstream flow passage 22. In this manner, the non-adsorption components G3 flowing through the outlet pipe 5 for the upper adsorption tank 2 are discharged through the flow passage 17 to the flow passage 22.

During this time, the concentration sensor 25 for the flow passage 22 monitors the concentration of carbon dioxide in the non-adsorption components G3. As the adsorption amount of carbon dioxide in the adsorbent layer 8 in the upper adsorption tank 2 is increased to approximate the maximum amount adsorbed by the adsorbent layer 8, the carbon dioxide partial pressure in the non-adsorption components G3 is increased. Thus, at a time when the carbon dioxide partial pressure detected by the concentration sensor 25 is increased to some extent, the three-way valves 15, 21 and 23 are switched. Specifically, the adsorption step having been conducted in the upper adsorption tank 2 in the above is then conducted in the lower adsorption tank 2 while the desorption step is conducted in the upper adsorption tank 2.

The three-way valve 15 is switched to close between the flow passage 14 and the inlet pipe 3 and open between the flow passage 14 and the inlet pipe 4. The three-way valve 21 is switched to open between the flow passages 16 and 20 and close between the flow passages 18 and 20. The three-way valve 23 is switched to close between the flow passages 17 and 22 and open between the flow passages 19 and 22.

In this manner, the gas mixture G1 supplied from the flow passage 14 under the adsorption pressure is caused to flow through the lower inlet pipe 4 into the lower adsorption tank 2 where conducted is the adsorption step of adsorbing carbon dioxide as the adsorption component G2 to the adsorption layer 8. The remaining non-adsorption components G3 are discharged through the lower outlet pipe 6 and the flow passage 19 to the flow passage 22. On the other hand, in the upper adsorption tank 2, passageway through the outlet pipe 5 and the flow passage 16 to the flow passage 20 is opened so that inner pressure is lowered to the desorption pressure near the atmospheric pressure. Then, conducted is the desorption step of desorbing carbon dioxide as the adsorption component G2 adsorbed in the adsorbent layer 8. The desorbed carbon dioxide is discharged through the outlet pipe 5 and the flow passage 16 to the flow passage 20, and then is delivered to later stage condensation or storage installation (not shown).

Also during the adsorption step being conducted in the lower adsorption tank 2, the concentration sensor 25 monitors the concentration of carbon dioxide in the non-adsorption components G3. At a time when the concentration is increased to some extent, the adsorption amount of carbon dioxide in the adsorbent layer 8 of the lower adsorption tank 2 is determined to approximate its maximum value and the three-way valves 15, 21 and 23 are switched again. In the upper adsorption tank 2, carbon dioxide has been desorbed from the adsorbent layer 8 by the above-mentioned antecedent desorption step. Therefore, by introducing the pressurized gas mixture G1 here through the flow passage 14 and the inlet pipe 3, the adsorption step can be conducted again. The non-adsorption components G3 are discharged through the outlet pipe 5 and the flow passage 17 to the flow passage 22. In the lower adsorption tank 2, passageway through the outlet pipe 6 and the flow passage 18 to the flow passage 20 is opened to lower the pressure to the desorption pressure; carbon dioxide adsorbed as the adsorption component G2 in the precedent adsorption step is desorbed and discharged to the flow passage 20. In this manner, in the gas concentrator 1 of the embodiment, desorption and adsorption steps are alternately repeated between the vertically stacked two adsorption tanks 2 so that carbon dioxide as the adsorption component G2 can be continuously separated from the gas mixture G1.

Though such gas concentration by the pressure swing adsorption process itself is similar to that in the conventional gas concentrators, the gas concentrator 1 of the embodiment sets the gas flow in the adsorption tank 2 to a direction not along to the vertical direction but along to the horizontal direction, which suppresses great increase in construction cost while ensuring great volumes of the adsorption tanks 2.

Specifically, in order to cause the adsorption component to be effectively adsorbed to the adsorbent layer in the adsorption step in the pressure swing adsorption process in general, passing distance of the gas mixture in the adsorbent layer requires to be long to some extent. In this respect, in the conventional mode where the gas mixture is supplied from below to and is discharged upward from the column-type adsorption tank to keep enough the passing distance of the gases requires the adsorption tank to have sufficient height. Thus, downwardly applied weight per unit area in the adsorption tank becomes great relative to a volume thereof. Thus, increase in size of the adsorption tank substantially increases construction cost for a foundation.

On the other hand, in the construction as in the embodiment where gases are passed through the adsorbent layer 8 along the horizontal direction, distance for the adsorption may be ensured along the horizontal direction. Thus, the adsorption tank 2 can be suppressed in height to decrease weight per unit area, thereby substantially reducing the construction cost for the foundation.

Moreover, in the gas concentrator 1 of the embodiment, heat problems due to increase in size of the adsorption tank 2 are coped with, for example, by uniformization in flow of gases in the adsorption tank 2 and arrangement of the heat-transfer bodies 10.

Specifically, in the adsorption step, heat is generated upon adsorption of the gas to the adsorbent layer 8 as mentioned in the above. The heat is not always generated evenly throughout the adsorbent layer 8. Heat generation may be biased depending on, for example, state of the adsorbent 8a filled in the adsorbent layer 8 (see FIGS. 1-3) and state in flow of the gases; there may be a case where a great amount of heat is locally generated in a specific portion in the adsorbent layer 8. The greater the volume of the adsorbent layer 8 is, the more such bias in heat generation tends to be generated. The greater the volume of the adsorbent layer 8 is and the greater the amount of the gases flowing into the adsorbent layer 8 is, the greater the total amount of heat generated may be and the greater the effects due to unevenness of heat generation may be.

Thus, in the gas concentrator 1 of the embodiment, by the construction of the dispersion plates 7 and plurally branched branch pipes 3a, 4a, 5a and 6a, the flow of the gas mixture G1 passed through the adsorption tank 2 is uniformized to some extent (see FIGS. 1 and 2). Moreover, the valves 3b, 4b, 5b and 6b are arranged for the branch pipes 3a, 4a, 5a and 6a, respectively, so that minute adjustment of the opening degree of each of the valves 3b, 4b, 5b and 6b can control flow rates of the gases passing through the branch pipes 3a, 4a, 5a and 6a to rectify the flow of the gases in the adsorption tank 2.

Further, the adsorbent layers 8 filled in in the upper and lower adsorption tanks 2 are mutually connected through the heat-transfer bodies 10 as mentioned in the above (see FIGS. 1-3). The heat-transfer bodies 10 are such that any heat generated in the adsorbent layer 8 in one of the adsorption tanks 2 can be quickly transmitted to the adsorption layer 8 of the other adsorption tank 2. Thus, even if the adsorption heat is generated in one of the adsorption tank 2 in the adsorption to cause local increase in temperature in the adsorbent layer 8, the heat can be quickly released through the heat-transfer bodies 10 to the other adsorption tank 2 which is in the desorption step. Thus, any situation of the adsorbent 8a being partly exposed to high temperature is prevented beforehand. Moreover, the higher the temperature of the adsorption component G2 adsorbed to the adsorbent 8a is, the more it tends to be desorbed. Thus, by the heat recovered from the one of the adsorption tanks 2 in the adsorption step, advantageously the desorption step in the other adsorption tank 2 effectively proceeds.

Moreover, heat transfer is also conducted through the partition plate 9 partitioning the upper and lower adsorbent layers 8. Here, in the gas concentrator 1 of the embodiment, the stacked construction of the adsorption tanks 2 ensures great the contact area through the partition plate 9. To arrange the two adsorption tanks close together through the partition plate might be possible by, for example, arranging the two adsorption tanks side by side; however, in order to obtain great contact area in such arrangement, height of the adsorption tanks would be inevitably increased after all. If the adsorption tanks were to be increased in size in such a shape, then increase in construction cost for the foundation would be inevitably involved. In comparison with this, the arrangement of the adsorption tanks 2 as in the embodiment enables the adsorption tanks 2 to be contacted with a greater contact area while the whole of the gas concentrator 1 is maintained low in height.

Moreover, in the construction where the adsorption tanks 2 are close together through the partition plate 9 as in the embodiment, the partition plate 9 as the constitutive member is shared by the two adsorption tanks 2, which contributes to reduction in material cost for construction of the adsorption tanks 2.

Further, a maintenance work for the gas concentrator 1 in the embodiment will be described. Generally, adsorbent used in the pressure swing adsorption type gas concentrator is gradually deteriorated in adsorption capability through repeated adsorption and desorption, and thus requires to be replaced once in several years. Conventionally, such adsorbent replacement work has been conducted manually by persons entering into the cylindrical adsorption tank. However, when the adsorption tank is large in volume and a great amount of adsorbent is filled in the tank, such manual replacement is difficult to carry out and involves much time and cost.

In the gas concentrator 1 of the embodiment, the lid bodies 2c are arranged as the top faces of the upper adsorption tank 2 as mentioned in the above (see FIG. 1). To open the lid bodies 2c enables access to the inner adsorbent layer 8 and the like from above. The adsorbent layer 8 is constituted as an assembly of the adsorbent units 8b each comprising the basket body 8c with the adsorbent 8a therein. Thus, for example, by suspending the adsorbent unit 8b from above using a crane, the replacement work of the adsorbent unit 8b can be conducted without using human power.

Vertically stacked arrangement of the adsorption tanks 2 is advantageous also in such replacement work. If the adsorption tanks were arranged side by side, the partition plate would be arranged to have a surface along the vertical direction while the heat-transfer bodies interconnecting the adsorbent layers in the adsorption tanks would be arranged along the horizontal direction to pass through the partition plate. Thus, try to move the adsorbent units vertically would be barred by the heat-transfer bodies. On the other hand, when the two adsorption tanks 2 are arranged in vertically stacked manner as in the embodiment, the heat-transfer bodies 10 are arranged along the vertical direction as shown in FIGS. 1 and 3. Thus, when the replacement work is conducted by suspending the adsorbent unit 8b from above of the adsorption tank 2, the movement of the adsorbent unit 8b is not barred by the heat-transfer bodies 10. Thus, for example, the following procedures can be conducted smoothly. 1) The upper adsorbent unit 8b is lifted vertically out of the adsorption tank 2; 2) the petty partition plate 9a positioned thereunder is lifted vertically together with the heat-transfer bodily 10 for removal thereof; and 3) the adsorbent unit 8b positioned thereunder is moved.

In the vertically arranged adsorption tanks 2, the divided positions of the upper and lower adsorbent layers 8 are matched with in planar view with those of the partition plate 9. Thus, for example, after the upper adsorbent units 8b are extracted, the petty partition plate 9a and adsorbent unit 8b positioned thereunder can be extracted without being blocked by any other adsorbent unit 8b. Alternatively, the vertically stacked two adsorbent units 8b and the petty partition plate 9a arranged therebetween may be lifted all together.

As is clear from above, the embodiment mentioned in the above comprises the adsorption tank 2 into and through which the gas mixture G1 is introduced and passed along the horizontal direction and the adsorption layer 8 in the adsorption tank 2 to adsorb a gas in the gas mixture G1 as the adsorption component G2 when the gas mixture G1 is introduced into the adsorption tank 2 under the adsorption pressure and desorb the adsorbed adsorption component G2 when the adsorption tank 2 is reduced in pressure into the desorption pressure lower than the adsorption pressure. In this manner, upon arrangement of the pressure swing adsorption type gas concentrator 1, sufficient passing distance of the gases in the adsorption layer 8 can be ensured along the horizontal direction. Moreover, the adsorption tank 2 can be suppressed in height to reduce construction cost for the foundation.

Further, in the embodiment, the plural adsorption tanks 2 are arranged in proximity to each other, the adsorbent layers 8 in the plural adsorption tanks 2 being connected to each other through the heat transferring heat-transfer bodies 10. In this manner, the adsorption heat generated in one of the adsorption tanks which is in the adsorption step can be released through the heat-transfer bodies 10 to the other adsorption tank 2 which is in the desorption step, whereby high temperature of the adsorbent layer 8 in the adsorption step can be avoided. Moreover, the adsorption heat generated in the one of the adsorption tanks 2 can be utilized for progress of the desorption in the other adsorption tank 2.

In the embodiment, the adsorption tanks 2 are arranged in the vertically stacked manner and the adsorbent layers 8 in the vertically arranged adsorption tanks 2 are close together through the partition plate 9. In this manner, the adsorption heat generated in the one of the adsorption tanks 2 which is in the adsorption step can be released through the partition plate 9 to the other adsorption tank 2 which is in the desorption step, and material cost can be reduced in construction of the adsorption tanks 2.

In the embodiment, the adsorbent layer 8 is divided into the plural adsorbent units 8b each with the adsorbent 8a. The partition plate 9 is divided into the plural petty partition plates 9a. Among the mutually vertically arranged adsorption tanks 2, the upper adsorption tank 2 has the top faces which enable access form outside of the adsorption tank 2 into an inner space. Thus, the replacement work of the adsorbent 8a and the like can be conducted, using a crane or the like.

In the embodiment, the divided positions of the adsorbent units 8b in the adsorbent layer 8 of the vertically arranged adsorption tanks 2 are matched in planar view with those of the partition plate 9 into the petty partition plates 9a. Thus, the replacement work of the adsorbent 8a using the crane or the like can be conducted even simpler.

Thus, according to the above-mentioned embodiment, construction cost can be reduced and high temperature of the adsorption tank in the adsorption step can be prevented while ensuring enough volume of the adsorption tank.

It is to be understood that a gas concentrator according to the invention is not limited to the above embodiment and that various changes and modifications may be made without departing from the scope of the invention. For example, it may be applied not only to coal-fired boilers including an oxyfuel combustion boiler but also to gas separation from exhaust gases of various boilers. Further, it may be applied not only to separation of carbon dioxide from exhaust gases but also to gas separation from various gas mixture.

REFERENCE SIGNS LIST

1 gas concentrator
2 adsorption tank
8 adsorbent layer
8a adsorbent
8b adsorbent unit
9 partition plate
9a petty partition plate
10 heat-transfer body
G1 gas mixture
G2 adsorption component

The invention claimed is:

1. A pressure swing adsorption type gas concentrator comprising
   adsorption tanks into and through which a gas mixture of plural kinds of gases is introduced and is passed along a horizontal direction, and
   an adsorbent layer housed in each of the adsorption tanks to adsorb a gas in the gas mixture as an adsorption component when the gas mixture is introduced under an adsorption pressure to the adsorption tanks and desorb the adsorbed adsorption component when the adsorption tanks are reduced in pressure to a desorption pressure lower than the adsorption pressure, wherein
   the adsorption tanks are arranged in a vertically stacked manner, the adsorbent layers in the vertically arranged adsorption tanks being close together through a partition plate,
   each of the adsorbent layers is divided into a plurality of adsorbent units each with adsorbent,
   the partition plate is divided into a plurality of petty partition plates, and
   an upper one of the vertically arranged adsorption tanks includes top faces which enable access from outside of the adsorption tank into an inner space.

2. The gas concentrator as claimed in claim 1, wherein the adsorption tanks are arranged in proximity to one another, the adsorbent layers in the adsorption tanks being connected together through heat-conductive heat-transfer bodies.

3. The gas concentrator as claimed in claim 1, wherein divided positions of each of the adsorbent layers in the vertically arranged adsorption tanks are matched in planar view with those of the partition plate into the petty partition plates.

4. The gas concentrator as claimed in claim 2, wherein divided positions of each of the adsorbent layers in the vertically arranged adsorption tanks are matched in planar view with those of the partition plate into the petty partition plates.

* * * * *